United States Patent
Celada-Gonzalez et al.

[11] Patent Number: 6,039,916
[45] Date of Patent: Mar. 21, 2000

[54] APPARATUS FOR PRODUCING DIRECT REDUCED IRON WITH A CONTROLLED AMOUNT OF CARBON

[75] Inventors: Juan Celada-Gonzalez; Raul Gerardo Quintero-Flores; Ricardo Viramontes-Brown, all of San Pedro Garza Garcia; Roberto Octaviano Flores-Serrano, Monterrey, all of Mexico

[73] Assignee: Hylsa S.A. de C.V., San Nicolas de los Garza, Mexico

[21] Appl. No.: 09/175,396

[22] Filed: Oct. 19, 1998

Related U.S. Application Data

[62] Division of application No. 08/719,930, Sep. 25, 1996, Pat. No. 5,858,057.

[51] Int. Cl.⁷ ........................................ C21B 13/02
[52] U.S. Cl. ......................... 266/82; 266/155; 266/156
[58] Field of Search ................... 266/82, 155, 156

[56] References Cited

U.S. PATENT DOCUMENTS 5,840,097  11/1998  Dam .......................................... 266/156

*Primary Examiner*—Melvyn Andrews
*Attorney, Agent, or Firm*—A. Thomas S. Safford; Frommer Lawrence & Haug LLP

[57] ABSTRACT

Method and apparatus for the production of prereduced iron ore, Direct Reduced Iron (DRI), or the like, in an ironmaking plant wherein the reducing gas utilized in the chemical reduction of iron oxides is generated from natural gas within the reduction reactor system by reforming the hydrocarbons with such oxidants as water and oxygen inside the reduction reactor which under steady state conditions contains metallic iron which acts as a reformation catalyst. The amount of carbon in the DRI can be reliably controlled by modifying the relative amounts of water, carbon dioxide and oxygen in the composition of the reducing gas fed to the reduction reactor. The amount of carbon in the DRI is controlled by the amount of water in the reducing gas fed to the reduction reactor while the addition of oxygen provides the energy necessary for such DRI carburization.

6 Claims, 1 Drawing Sheet

APPARATUS FOR PRODUCING DIRECT REDUCED IRON WITH A CONTROLLED AMOUNT OF CARBON

RELATED APPLICATION

This application is a division of U.S. application Ser. No. 08/719,930 filed Sep. 25, 1996) now U.S. Pat. No. 5,858, 057.

FIELD OF THE INVENTION

The present invention relates to a method and apparatus for the production of prereduced iron ore, Direct Reduced Iron (DRI), or the like, in an ironmaking plant wherein the reducing gas utilized in the chemical reduction of iron oxides is generated from natural gas within the reduction reactor system by reforming the hydrocarbons with such oxidants as water, carbon dioxide and oxygen inside the reduction reactor which under steady state conditions contains metallic iron which acts as a reformation catalyst. The amount of carbon in the DRI can be controlled by modifying the relative amounts of water, carbon dioxide and oxygen in the composition of the reducing gas fed to the reduction reactor. The invention provides a process which produces DRI without utilizing the currently used natural gas reformer external to the reduction reactor system with high efficiency and reliability, thus decreasing the capital and operation costs of the direct reduction plants.

BACKGROUND OF THE INVENTION

Direct reduction plants for producing direct reduced iron known as DRI or sponge iron, hot briquetted iron, or the like (in general prereduced materials useful as feedstocks for iron and steelmaking), currently produce it by reacting a reducing gas, at temperatures in the range of 750 to 1050° C. and composed principally of hydrogen and carbon monoxide, with a bed of particulate iron-containing material in the form of lumps or pellets. Nowadays, most operating direct reduction plants utilize a moving bed reactor where the gases flow countercurrently to a gravity descending bed of iron ore particles flowing down through the reactor. Examples of such processes are described in U.S. Pat. Nos. 3,749,386; 3,764,123; 3,816,101; 4,002,422; 4,046,557; 4,336,063; 4,375,983; 4,428,072; 4,556,417; and U.S. Pat. No. 5,078,787.

It is known that DRI used as a charge or part of the charge to a steelmaking electric arc furnace (EAF) should desirably contain certain amounts of carbon chemically combined with the iron in the DRI material. Combined carbon, in contrast to the free carbon which can be added to the molten iron bath in the EAF, as soot in the DRI or as graphite, provides a number of advantages to the steelmaking process, e.g., a larger proportion of said carbon (about 70 to 85%) remains in the liquid iron bath and contributes to further reduction of the iron oxides contained in the DRI feedstock forming carbon monoxide; the reduction reactions of this carbon monoxide produce gas bubbles which form a "foamy" slag layer over the molten iron bath with its much appreciated effects on the protection of the EAF walls against the radiation of the electric arc; the carbon monoxide also provides energy to the EAF when further oxidized to carbon dioxide, this saving in electric energy consumption.

It has long been desired to have direct reduction process wherein the DRI product contains the right amount of chemically combined carbon which best fits the particular characteristics of a steelmaking operation.

The currently operating reduction processes produce DRI with an amount of carbon within a certain narrow range, between 0.8% to 1.8% depending on the average composition of the reducing gas, because the carburization is affected principally by the Boudouard's reaction: $2CO \rightarrow C + CO_2$. This reaction is exothermic and is promoted at relatively lower temperatures, i.e., in the range of 500° C. to 700° C.; consequently, it has been customary to promote this carburization reaction in those processes wherein the DRI product is cooled down to ambient temperatures before being discharged from the reduction reactor by circulating a CO-containing gas through the cooling-discharge portion of said reactor.

Another way of obtaining a DRI product with a desired amount of carbon is to contact the hot DRI product with natural gas in the cooling zone of the reactor. The hydrocarbons in natural gas, as exemplified by methane, crack to elemental carbon which combines with the metallic iron and hydrogen plus carbon monoxide, utilized in the reduction zone. This is a well-known practice, as shown, for example, in U.S. Pat. No. 4,046,557 and 4,054,444, which latter patent also proposes to feed the carburizing natural gas to the intermediate zone between the reduction zone and the cooling zone of the reduction reactor in order to utilize the heat of the DRI for cracking the hydrocarbons.

The cracking reaction involved is $CH \rightarrow C + 2H$. Since cracking of hydrocarbons is strongly endothermic this reaction is mostly used in those processes producing "cold" DRI product. Due to the above reaction, natural gas has been used as a coolant in some processes for example, in U.S. Pat. Nos. 3,765,872 and 5,437,708. This latter patent discloses a process wherein the amount of carbon in the DRI is increased by extending the residence time of the DRI produced in the reaction zone. This method, however, is not practical because the residence time is increased from 5 to 6 hours to 9 to 15 hours. This requires a larger reactor in order to have the same production rate.

Fine and reliable control of carburization of DRI becomes somewhat more difficult when the DRI product is conveniently discharged from the reduction reactor at high temperatures (i.e., above 550° C.) for immediate utilization in an EAF with great advantages in energy savings and productivity of the steelmaking process, or for production of hot briquetted iron (HBI) with its advantages, its transportation by land or sea and its use in the steelmaking furnace. There have been some proposals for achieving the desired amount of carbon combination in a process producing hot DRI. One such method is described in U.S. Pat. Nos. 4,834,792 and 4,734,128. These patents describe processes where a reducing gas with a predetermined reducing power is produced in a separate reformation furnace, where hydrocarbons in natural gas are converted to $H_2$ and CO in the reforming furnace and the carburizing hydrocarbons are added to the reducing gas fed to the reactor.

Another proposal for producing "hot" DRI with a high amount of carbon is disclosed in German OS 44 37 679 A1 wherein natural gas is fed to the discharging portion of tile reduction reactor in order to crack the hydrocarbons utilizing the heat of the DRI flowing down from the reduction zone. This method of carburization is the same as described above with the only difference that the reducing gas is produced within the reactor. This patent, however, presents the drawback that again the amount of energy available for carrying out the endothermic carburization reactions is the heat of the DRI; if the DRI is to be discharged at high temperature, the amount of carburization will be very limited.

The present invention is an improvement over the prior art processes and particularly discloses an improvement over U.S. Pat No. 5,110,350 to Villarreal-Trevino et al. This patent describes a direct reduction process without an external natural gas reformer, wherein the reducing gases are generated by reformation of natural gas with water, added to the reducing,gas before the reducing gas stream is heated, by saturating it with hot water taken from the off gas cooler. The mixture of natural gas water and recycled gas is heated in a gas heater and fed into the reduction reactor wherein the reformation reactions, the reduction reactions and the carburization reactions, all take place therein. This patent, however, does not utilize oxygen for partial combustion of the reducing gas before this gas is fed to the reduction reactor in order to provide the energy necessary for carburization of the DRI to the desired predetermined degree.

Other patents which are related prior art are U.S. Pat. No. 3,375,099 to W. E. Marshall which discloses a reduction process for iron oxides wherein natural gas or methane is partially combusted with oxygen in a combustion chamber for production of hydrogen and carbon monoxide in a known manner. Only a minor portion of the regenerated gas can be recycled to the reactor because the temperature of the gas entering the reactor would fall down excessively since no gas heater for the recycled stream is provided. The consumption of fresh natural gas is therefore large and valuable reducing gas must be wasted because of this limitation. The consumption of oxygen is also high because all the heating necessary for raising the temperature of the reducing gas to the reduction level must be provided by partial combustion of the natural gas with, oxygen.

U.S. Pat. No. 5,064,467 to Dam et al. discloses a direct reduction process similar to that of the German OS 4,437,679 wherein the reducing gases are produced by partial combustion of a mixture of recycled gas and natural gas with air or air plus oxygen whereby the hydrocarbons of the natural gas are reformed within the reduction reactor as known in the art. This process, however, does not take advantage of a good level of humidity for reformation of the natural gas but relies on carbon dioxide and oxygen for reformation. Since this process does not comprise a $CO_2$ removal unit for regenerating the recycled gas, the amount of gas exported from this system is in the order of 30% of the gas effluent from the reactor.

U.S. Pat. No. 4,528,030 to Martinez Vera et al. discloses a reduction process without an external reformer where natural gas is reformed with steam as the main oxidant within the reduction reactor. This patent, however, does not include addition of oxygen for increasing the temperature of the reducing gas entering the reactor and for providing the energy necessary for carburization of the DRI and the flexibility for controlling the amount of carbon control as in the present

SUMMARY OF THE INVENTION

It is an object of the present invention to provide a method and an apparatus for producing DRI with a predetermined amount of carbon by controlling the addition of water and oxygen which are mixed with the reducing gas entering the reduction reactor.

It is another object of the invention to provide a method and an apparatus for reducing iron oxides with great efficiency in a reduction reactor system without utilizing the currently used natural gas reformer.

Other objects and advantages of the invention will be evident to those skilled in the art or will be described in this specification of the invention and appended drawings.

According to the present invention, the objects thereof are achieved by providing a method and apparatus as follows:

A method for producing direct reduced iron (DRI) with a controlled amount of carbon, in a reduction system without a natural gas reformer and wherein the reducing gas is generated by reformation of the hydrocarbons in the reducing gas with water and oxygen within the reduction system, the method being carried out in a moving bed reduction reactor, having a reduction zone, where iron-oxides-containing particulate materials are, at least partially, chemically reduced to metallic iron by a high-temperature reducing gas comprising hydrogen and carbon monoxide as reducing agents, the method comprising: introducing the iron-oxides-containing particulate material to the upper part of the reduction zone of the reactor; feeding to the reduction zone a first stream of reducing gas at a temperature in the range from about 900° C. to about 1150° C. and causing the hot reducing gas to flow upwardly through the reduction zone to at least partially reduce the iron oxides therein into metallic iron, carburizing the metallic iron with carbon from the reducing gases fed into the reactor, thus producing DRI having chemically combined carbon to a controlled and predetermined degree; withdrawing from the reduction zone a second stream of exhausted reducing gas at a temperature in the range from about 250° C. to about 450° C.; passing the second stream through a heat exchanger where heat is recuperated from the second stream; cooling down the second stream in a cooler-scrubber unit by direct contact of the gas stream with liquid water for dewatering and cleaning the second stream; removing carbon dioxide from a portion of the second stream resulting in a third stream containing no more than about 10% of carbon dioxide; mixing the third stream, with natural gas to form a fourth stream of reducing gas; increasing the water content in the fourth stream by contacting the gas with hot water effluent from the cooler scrubber; adjusting the water content in the fourth stream to a value in the range from about 5% to about 12%; heating the fourth stream to a temperature in the range from about 850° C. to about 1000° C.; mixing the hot fourth stream with an oxygen-containing gas to raise the temperature of the fourth stream in the range from about 950° C. to about 1150° C. to form the first stream; and discharging the DRI with a controlled and predetermined amount of carbon from the reactor An apparatus for producing DRI which comprises a reduction reactor, pumping means and conduit means for circulating at least a portion of the top effluent gas from the reactor in a reduction loop comprising the reduction reactor, a cooling and scrubbing unit for cooling and cleaning the top effluent gas, a carbon dioxide removal unit, a gas heater capable of raising the temperature of the gas stream circulating through the loop to the range between about 850° C. and about 980° C., means for mixing natural gas ninth the recycled top effluent gas from the reduction reactor before passing through the gas heater, and means for mixing and controlling an amount of an oxygen-containing gas with the recycled gas before the gas enters the reactor,whereby a DRI product is obtained with a predetermined amount of carbon.

BRIEF DESCRIPTION OF THE DRAWINGS

In this specification and in the accompanying drawings, some preferred embodiments of the invention are shown and described and various alternatives and modifications thereof have been suggested. It is to be understood that these are not intended to be exhaustive and that many other changes and modifications can be made within the scope of the invention. The suggestions herein are selected and included for purposes of illustration in order that others skilled in the art sill more fully understand the invention and the principles thereof and will thus be enabled to modify it in a variety of forms, each as may be best suited to the conditions of a particular use.

DETAILED DESCRIPTION OF PREFERRED EMBODIMENT

Figure 1:
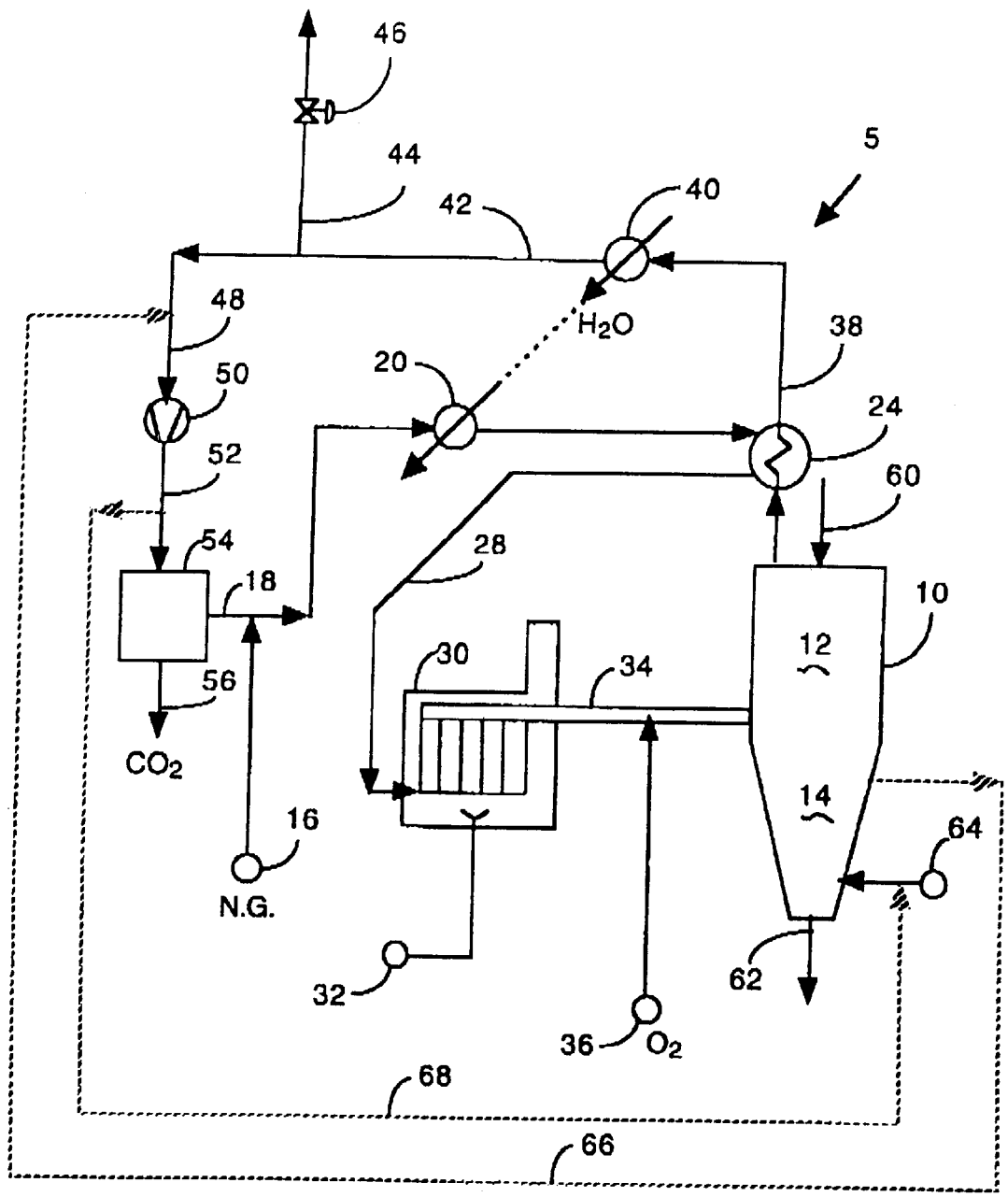
FIG. 1 shows a schematic diagram of a preferred embodiment of the present invention.

With reference to FIG. 1, numeral 5 generally designates a reduction system comprising a moving bed reduction reactor 10 for the chemical reduction of iron oxides, having a reduction zone 12 and a discharge zone 14. Natural gas is fed to the reduction system 5 from a suitable source 16 and is mixed with recycled and regenerated reducing gas from reactor 10 through pipe 18. The mixture of natural gas and recycled gas is then passed through a humidifier 20 where hot water at a temperature in the range from about 60° C. to about 90° C. is contacted with the gas stream resulting in a gas stream flowing through pipe 22 with a content of water, in the range from about 5 to about 12 volume percent. This water is used as an oxidant for reformation of the hydrocarbons present in the natural gas within the reduction reactor 10. The humidified mixture of natural gas and recycled gas is preheated in heat exchanger 24 to a temperature from about 300° C. to about 400° C. by heat recuperation from the still hot gas stream effluent from reactor 10 through pipe 26 and flows through pipe 28 to gas heater 30 where its temperature is raised to a range from about 850° C. to about 960° C. Gas heater 30 is fired by combustion of a suitable fuel from a source 32 in a manner known in the art. The hot reducing gas flows then through transfer line 34 and is mixed with an oxygen-containing gas from a source 36. Since a major portion of the gas passing through the reactor 10 is recycled back to the reactor, it is preferred to use pure oxygen instead of air or oxygen-enriched air because the nitrogen of the air would accumulate in the recycled gas. The partial combustion of the reducing gas With oxygen raises its temperature to the range from about 1000° C. to about 1100° C. Also, this partial combustion, besides providing energy for carrying out the endothermic carburization reactions of the DRI, produces hydrogen and carbon monoxide from the hydrocarbons contained in the natural gas fed to the reduction system 5. The reducing gas entering the reactor and also containing hydrocarbons from the natural gas, reduces the iron oxides within the reactor and at the same time the oxidants contained in the reducing gas transform the methane and other hydrocarbons to hydrogen and carbon monoxide taking advantage of the catalytic qualities of the DRI (sponge iron) produced in the reduction reactor. The reducing gas, at a temperature in the range from about 250° C. to about 400° C., is withdrawn from reactor 10 through a pipe 26 which leads it to heat exchanger 24 and then flows through pipe 38 to a cooler-scrubber 40, where the reducing gas is cooled down by direct contact with cooling water. The hot water produced by cooler-scrubber 40 may be used to humidify the reducing gas recycled to the reactor, as described in U.S. Pat. No. 5,110,350. After having been cooled down and dewatered, the reducing gas flows through pipe 42 and is then divided into at least two portions. A minor portion flows through pipe 44 having a pressure control valve 46 through which some gas is purged from the system in order to maintain and control the pressure of the system and for elimination of undesired accumulations of inert gases. The major portion of the off reducing gas flows through pipe 48 and is moved by pumping means 50, which can be a blower or a compressor, in order to recycle the gas to reactor 10.

After pumping means 50, the gas flows through pipe 52 and then is passed through a suitable carbon dioxide unit 54 where carbon dioxide is separated from the other components of the reducing gas stream by suitable means as, for example, liquid absorber solutions (hot carbonate solutions, amines solutions or the like) PSA (pressure saving adsorption) units, or preferably VSA (volume swing adsorption) units. Carbon dioxide is separated and flows through pipe 56 to be utilized in a variety of ways.

After being stripped of the carbon dioxide, the recycled gas flows through pipe 18 thus completing the cycle. Iron oxide ore 60 in lump or pelletized form, is fed into reactor 10 through the upper portion of the reduction zone 12 and reacts with the hot reducing gas flowing counter-currently to the feed, and is finally discharged as DRI 62 with the desired amount of carbon.

If so desired, DRI may be discharged from the reduction reactor 10 at high temperature, for example, above about 500° C., or it may be discharged at a temperature below about 100° C., by cooling the DRI in the lower portion of the reactor through the circulation of a stream of cooling gas, usually natural gas, in contact with the DRI. For this purpose, a stream of natural gas is fed to the discharge zone 14 from a suitable source 64 and, if necessary, may be recycled back to the cooling zone, or otherwise it can be utilized for reduction purposes by transferring the gas through pipe 66 to the reduction circuit of the gas fed to the reduction zone 12 of reactor 10. For cooling purposes, also a portion of the reducing gas recycled by compressor 50 can be derived from pipe 52 and caused to flow through pipe 68 which is finally fed to the cooling-discharging zone 14 without being mixed with natural gas 64 or combined with the natural gas.

An example of the claimed process as practiced in a demonstration plant having a production rate in the range of 23 to 25 metric tons of DRI per day, is as follows: a reducing gas with a volume composition of water between 5% to 9.5% and a temperature in the range between 935° C. to 969° C. was mixed with oxygen, and its temperature raised to the range between 1013° C. to 1057° C. This gas was then fed to the reduction reactor and reacted with iron oxides to produce DRI with a constant metallization degree between 93.18% and 93.18%, and the carbon content in the DRI product was inversely proportional to the amount of water in the reducing gas and was in the range between 1.15% and 3.64%. The amount of carbon dioxide in the reducing gas before mixing with oxygen was 4.97% to 5.46% volume. This amount of carbon dioxide is considered practically constant. The average flow rate of reducing gas before mixing with oxygen was 2207 NCM/TonFe and the average flow rate of oxygen mixed with the reducing gas was 57 NCM/TonFe. The amount of natural gas fed as make-up to the reduction system was 265 NCM/TonFe. In one period of plant operation, the composition of the reducing gas before mixing with oxygen in percent volume was: hydrogen 48.25; carbon monoxide 14.52; carbon dioxide 5.02; methane 25.62; nitrogen 0.97; water 4.97; ethane 0.61 and propane 0.06. With the above composition the carbon in the DRI product was 3.64% and its metallization was 93.18%.

From the foregoing description it should be apparent that the present invention provides a process capable of achieving the several objects of the invention set forth above. Thus, it provides a novel and exceptionally efficient method of producing DRI with a predetermined and finely controllable amount of carbon without utilizing a reforming furnace for producing the reducing gas and by providing the energy for the DRI carburization by means of partial combustion with oxygen of the reducing gas entering the reduction reactor.

It is, of course, to be understood that the foregoing description is intended to be illustrative only and that numerous changes can be made in the structure of the system described and its operating conditions without departing from the spirit of the invention as defined in the appended claims.

We claim:

1. An apparatus for reducing particulate iron-oxide-containing particles to produce DRI with a controlled amount of carburization without an external reformer, which comprises:

a vertical shaft moving bed reduction reactor having a reducing zone, a reducing gas loop for circulating at least a major portion of the top effluent gas from the reducing zone of said reactor for conditioning and upgrading and return as improved recycle reducing gas to the reducing zone of said reactor, said loop including:

a cooling and scrubbing unit for cooling and cleaning said top effluent gas, pump for circulating recycle reducing gas through said loop and said reactor, a carbon dioxide removal unit for removal of carbon dioxide from the recycle reducing gas, a gas heater capable of raising the temperature of the gas stream circulating through said loop to the range between 850° C. and 1000° C., means for adjusting the water content of the recycle reducing gas, means for mixing natural gas with said recycle reducing gas, and means for mixing and controlling an amount of an oxygen-containing gas with said recycle reducing gas before said gas enters said reactor.

2. An apparatus according to claim 1, wherein said carbon dioxide removal unit is a pressure swing adsorption (PSA) unit.

3. An apparatus according to claim 1, wherein the means for adding natural gas to said loop is positioned to do so by mixing an effective amount of make up natural gas and make up water with said recycle reducing gas from said reduction reactor before passing through said gas heater.

4. An apparatus according to claim 1, wherein said carbon dioxide removal unit is a vacuum pressure swing adsorption (VPSA) unit.

5. An apparatus according to claim 1, wherein said carbon dioxide removal unit is an absorption unit comprising a liquid solution of amines.

6. An apparatus according to claim 1, further comprising a heat exchanger for preheating the gas stream circulating through said loop and cooling said top effluent gas.

* * * * *